(12) United States Patent
Berckmans

(10) Patent No.: US 6,876,981 B1
(45) Date of Patent: Apr. 5, 2005

(54) METHOD AND SYSTEM FOR ANALYZING AND COMPARING FINANCIAL INVESTMENTS

(76) Inventor: Philippe E. Berckmans, 360 E. 65th St., Apt. 18F, New York, NY (US) 10021

( * ) Notice: Subject to any disclaimer, the term of this patent is extended or adjusted under 35 U.S.C. 154(b) by 523 days.

(21) Appl. No.: 09/427,426

(22) Filed: Oct. 26, 1999

(51) Int. Cl.[7] .................................. G06F 17/60
(52) U.S. Cl. ..................... 705/35; 705/36; 705/1; 705/500
(58) Field of Search ................. 705/35, 36, 1, 705/500

(56) References Cited

U.S. PATENT DOCUMENTS

| | | | | | |
|---|---|---|---|---|---|
| 4,989,141 A | * | 1/1991 | Lyons et al. | ................... | 705/36 |
| 5,058,009 A | * | 10/1991 | Yoshino et al. | ............... | 705/38 |
| 5,214,579 A | * | 5/1993 | Wolfberg et al. | ............. | 705/36 |
| 5,675,746 A | * | 10/1997 | Marshall | ..................... | 705/35 |
| 5,765,144 A | * | 6/1998 | Larche et al. | ................. | 705/38 |
| 5,774,878 A | * | 6/1998 | Marshall | ..................... | 705/35 |
| 5,878,405 A | * | 3/1999 | Grant et al. | .................. | 705/39 |
| 5,918,217 A | * | 6/1999 | Maggioncalda et al. | ...... | 705/36 |
| 5,999,918 A | * | 12/1999 | Williams et al. | ............. | 705/36 |
| 6,012,043 A | * | 1/2000 | Albright et al. | .............. | 705/36 |
| 6,026,381 A | * | 2/2000 | Barton, III et al. | .......... | 705/35 |
| 6,064,984 A | * | 5/2000 | Ferguson et al. | ............ | 705/36 |

* cited by examiner

Primary Examiner—Tariq R. Hafiz
Assistant Examiner—Akiba Robinson-Boyce
(74) Attorney, Agent, or Firm—Holland & Hart LLP

(57) ABSTRACT

A computer display for analyzing and comparing financial investments. The display includes an investment display section containing an investment table. The investment table includes a plurality of investment cells configured to represent a group of investment parameters. The investment cells may contain at least one cell bar having a size proportional to one of the investment parameters. The investment cells may contain a dynamic indicator color, wherein the indicator color changes according to the value of one of the investment parameters. The investment cells may further contain a text descriptive of at least one of the investment parameters.

25 Claims, 7 Drawing Sheets

METHOD AND SYSTEM FOR ANALYZING AND COMPARING FINANCIAL INVESTMENTS

COPYRIGHT NOTICE

A portion of the disclosure of this document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates, in general, to computer tools for analyzing and comparing data. More particularly, the present invention relates to analyzing and comparing financial data for stocks, stock options, bonds, and the like on a computer terminal.

2. Relevant Background

Investment options, such as stock options, are traded on many exchanges throughout the world and are a vital part of today's economic landscape. Simply stated, an option is the right to either buy or sell an underlying asset at a particular price and time in the future. Generally, investors purchase options to profit from or protect against an anticipated change in price of the underlying asset.

Every option has an associated strike price and an expiration date. The strike price, also referred to as an exercise price, is the price at which the underlying asset can be either bought or sold. Generally, if the option is a call option, the option holder has the right to buy the underlying asset at the strike price until the expiration, or maturity, of the option. If the option is a put option, the option holder has the right to sell the underlying asset at the strike price until the expiration of the option. The expiration date establishes the duration of the option. If an option holder does not exercise the option (by buying or selling the underlying asset at the option's strike price) before its expiration date, the option simply runs out and any value associated with the option is lost.

Investors deciding whether or not to purchase or sell a particular option typically try to determine if the option is undervalued, overvalued, or fairly priced. Although there may be countless different factors that investors take into consideration when deciding an option's value, there are several factors which the investing community as a whole generally pays close attention to when evaluating options. These factors typically include the strike price and maturity date of the option, the current price and volatility of the underlying asset, the interest rate, and several calculated parameters such as the delta, gamma, rho, theta, and vega of the option.

The delta value of an option is the rate of change in the price of the option with respect to the rate of change in price of the underlying asset. An option's gamma value is the sensitivity of its delta value to a change in the price of the underlying asset. The rho value is the rate of change in the option price with respect to changes in the interest rate. The theta value measures the rate of change in the option price with respect to the time decay of the option. Vega is the rate of change of the option price with respect to the volatility of the underlying stock.

Investors can typically find information about the value of options in financial newspapers, from television and radio programs, and on web sites over the Internet. Nevertheless, these publications and broadcasts do not generally convey many of the important option parameters discussed above. For example, radio and television programs often provide general market conditions, but typically lack specific information about individual investment options. Financial newspapers and web sites are better at covering individual options offered in some markets, however, they typically list only a minimal amount of information about each option, such as its trade price, strike price, expiration date, and trade volume.

One drawback of receiving incomplete information about an option is that an investor may have difficulty determining how a change in the market affects the option's value. For example, without knowing a stock option's delta value, it is difficult to know what impact a change in the underlying stock price will have on the option's value. In addition, providing more market data can help investors recognize patterns and trends of some options. Patterns and trends often provide insight to the future performance of an investment. Thus, by having access to more information about an option, the investor is able to make a more informed decision about the option's value.

Market activity in modern day exchanges is often characterized by fast moving prices and large volumes of trade. A drawback of some conventional information reporting systems is their delay in conveying market data to investors. For example, many financial newspapers typically examine market data from previous trading days and do not contain up-to-the-minute market data. Many web sites offering market data are also delayed by twenty minutes or more. Price swings within such short periods of time can have a significant impact on an option's value, and investors must react quickly to such changes in value. A delay of data can cause an investor to miss advantageous trading opportunities he or she may have otherwise acted upon. Access to current market activity information is therefore critical to many investors trying to secure favorable trades.

As earlier mentioned, an option is a right to purchase or sell its underlying asset at a specified price before the option's expiration date. A person purchasing an option forecasts market activity which will increase the value of the option before its maturity. Current option reporting and analysis methods generally lack an ability to help investors quickly determine if their predictions about the market will cause an option's value to increase. Conventional analysis and reporting systems typically present option data in static form, often only listing numeric values for parameters reported. This static data is represented in static text or tabular form making it difficult to perceive relationships, change, and activity at a glance. Such systems make an option's predicted performance difficult to visualize and compare to other options.

Therefore, there is a need for an improved system and method for reporting and analyzing financial data of investments in a way which avoids the shortcomings and drawbacks of prior art systems and methodologies.

SUMMARY OF THE INVENTION

Accordingly, a primary object of the present invention is to deliver more market data about financial investments to investors, while avoiding the shortcomings and drawbacks of prior art systems and methodologies. Another object of the present invention is to provide market data to investors in real-time, or near real-time. Another object of the present invention is to allow investors to quickly evaluate whether an investment will perform as excepted given the investors' predicted market movement. Another object of the present invention is to allow investors to compare the performance of two or more investments based on current and predicted market movement.

Briefly stated, the present invention involves a method for graphically representing investment information relating to a financial investment. The method includes the steps of providing an investment cell identified with the financial investment, linking a plurality of cell attributes to a plurality of investment parameters, wherein the investment parameters relate to the financial investment, displaying the cell attributes within the investment cell, and changing the cell attributes in response to a change in the investment parameters.

Another aspect of the invention is a system for displaying investment parameters on a computer terminal. The system includes an investment display section on the computer terminal, an investment table within the investment display section, a plurality of investment cells within the investment table, a plurality of cell attributes within the investment cells. The cell attributes are configured to represent investment parameter values.

In accordance with another aspect of the invention, the invention may be a computer program product as described below.

DETAILED DESCRIPTION OF THE INVENTION

Figure 1:
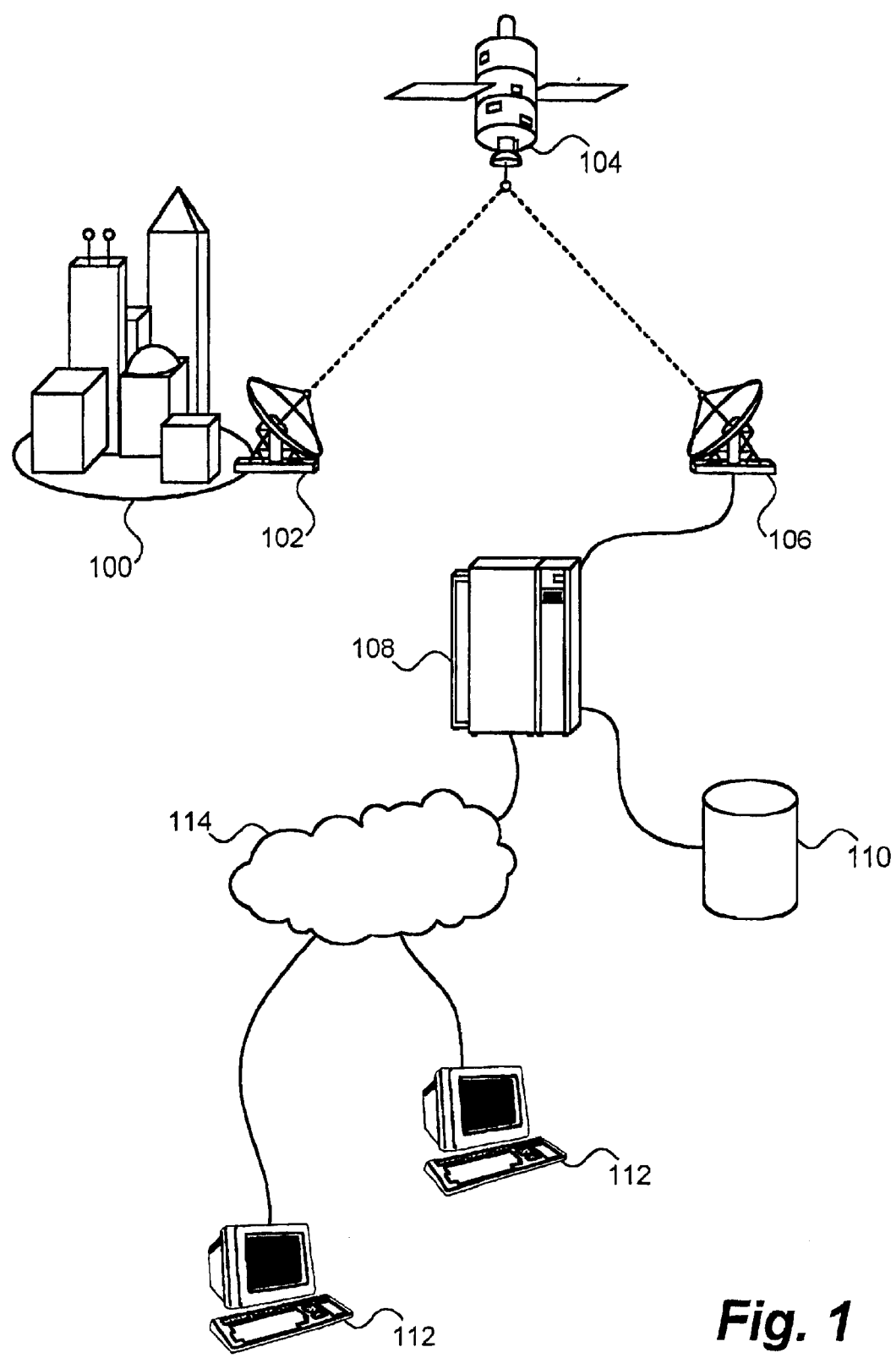
FIG. 1 shows a schematic view of an information exchanges environment as contemplated by the present invention.

Referring to the figures, like structures and elements shown throughout the figures are indicated with like reference numerals.

The present invention is directed towards a system and method for reporting and analyzing financial data over a computer network. FIG. 1 shows a schematic view of the present invention. As illustrated, financial data is generated at, for example, financial exchanges 100 and is transmitted, for example, by way of a satellite transmitter 102 to an orbiting satellite 104. The financial data may also come from other secondary and derivative sources as well. The financial data generated may include information about traded entities such as stocks, bonds, options, currencies, commodities, mutual funds, and many other traded assets. Furthermore, the information also contain meta-data, derivative data, or any number of trading tallies, such as opening and closing prices, changes in trading price and volume, available options, daily high and low figures, etc. The satellite 104 relays the data feed to a satellite receiver 106, which passes the data to a computing center 108. The data is then processed at the computing center 108 and stored in a mass storage unit 110.

As further described in more detail below, the computing center 108 communicates with clients 112 over a network 114. Financial data processed by the computing center 108 is cross referenced with client accounts, and is sent to the clients 112 over the network 114 according to the account details. Data received by a client is then displayed in a format which improves the client's ability to analyze and compare his or her investments.

It is contemplated that the financial exchanges 100 are located around the world and transmit their financial data as it changes, or on a "tick-by-tick" basis. Thus, the data sent from the computing center 108 to the clients 112 is considered real-time data, with only minimal throughput delay. Although financial data is shown transmitted from the financial exchanges 100 to the computing center 108 using radio communication, it is contemplated that other known communication methods, such as cable wire and fiber-optic lines, may be used to transfer data to the computing center 108. In addition, the network 114 of FIG. 1 is preferably an public network, such as the Internet. It is contemplated that other network configurations, such as a local area network (LAN) and a wide area network (WAN), may also be used with to the present invention.

Figure 2:
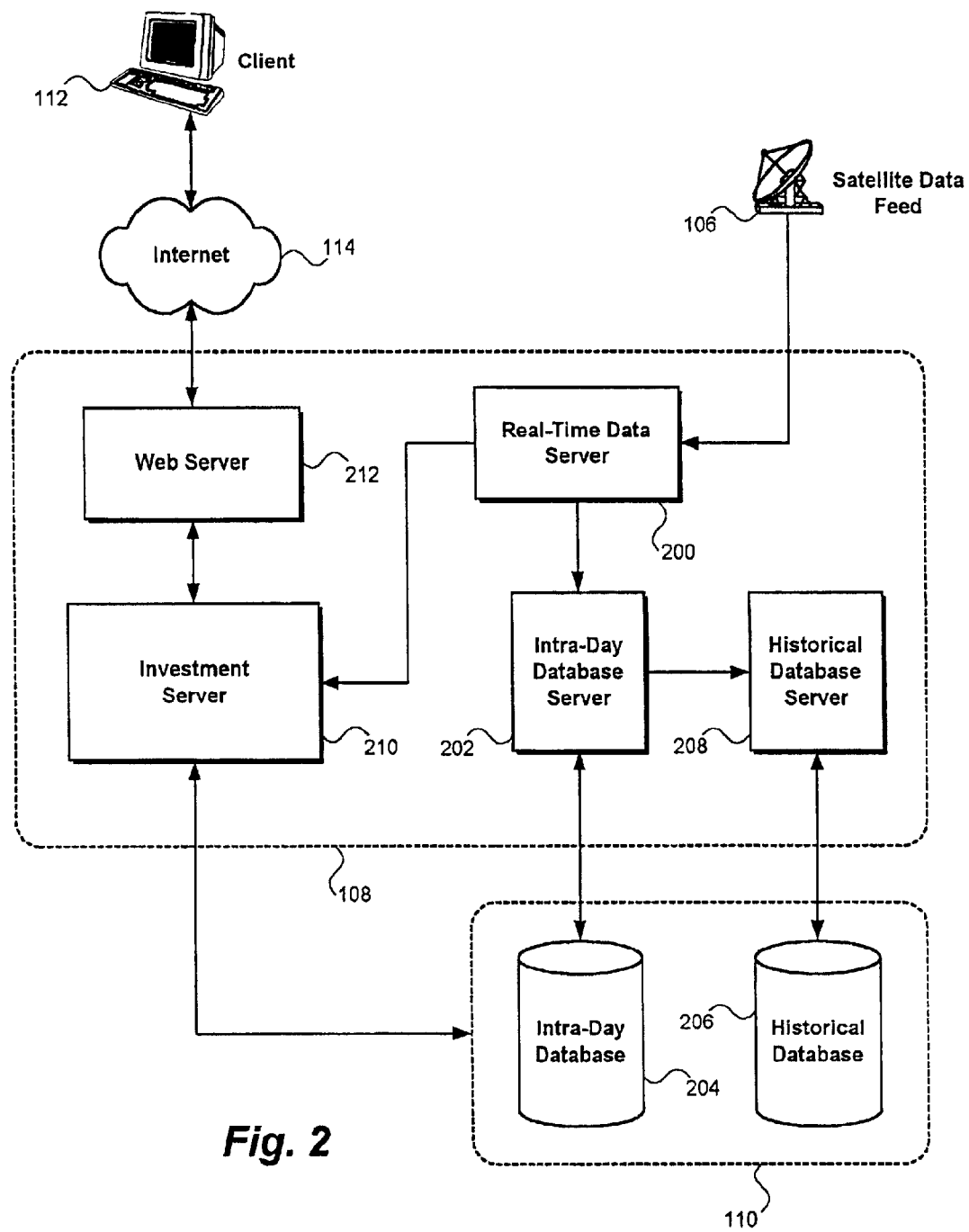
FIG. 2 shows a more detailed view of the present invention.

FIG. 2 shows a more detailed view of the present invention. The computing center 108 includes a number of servers and clients preferably configured using a distributed object protocol, such as the Common Object Request Broker Architecture (COBRA) standard. A real-time server 200 inputs financial data from the satellite receiver 106. Data received by the real-time server 200 may be compressed or otherwise encoded during transmission, and the real-time server 200 decodes and parses the data into a computer readable format as needed.

Data from the real-time server 200 is sent to an intra-day database server 202. The intra-day database server 202 determines if the received data should be discarded or recorded. Recorded data is stored in an intra-day database 204 located in the mass data storage unit 110. The intra-day database 204 contains a day long tick-by-tick accounting of stocks, options, bonds, and other assets traded in the various financial exchanges 100 reporting data to the computing center 108. Once the data in the intra-day database 204 becomes more than one day old, it is transferred to a historical database 206 by means of a historical database server 208. The historical database server 208 compresses, deletes, and otherwise manages the data in the historical database 206.

Data from the real-time server 200 is also sent to an investment server 210. The investment server 210 accesses client accounts and determines which clients 112 must be informed of the new data received from the real-time server 200. The investment server 210 then broadcasts the new data only to those clients interested in the data. The investment server 210 may also access and retrieve data from the mass storage unit 110. For example, when a client first logs into the computing center 108, the latest investment data relevant to the client is retrieved from the intra-day database 204 and is sent to the client. Once the client receives this initial data, any relevant new data from the real-time server 200 is broadcast to the client as described above.

A web server 212 manages all communications to and from clients 112 over the Internet 114. This responsibility includes client authorization and authentication, data encryption, IP address tracking, data streaming, and other communication issues well know in the art. Once a client receives financial data from the web server 212, it is displayed on the client's computer terminal through a graphical web browser program, such as Netscape(r) Communicator, Internet Explorer, and Mosaic, running on the client's computer 112. Netscape(r) is a registered trademark of Netscape Communications Corporation, based in Mountain View, Calif. In addition, customized web browser programs tailored to the present invention may also be used to display financial data at the client's computer 112.

Figure 3:
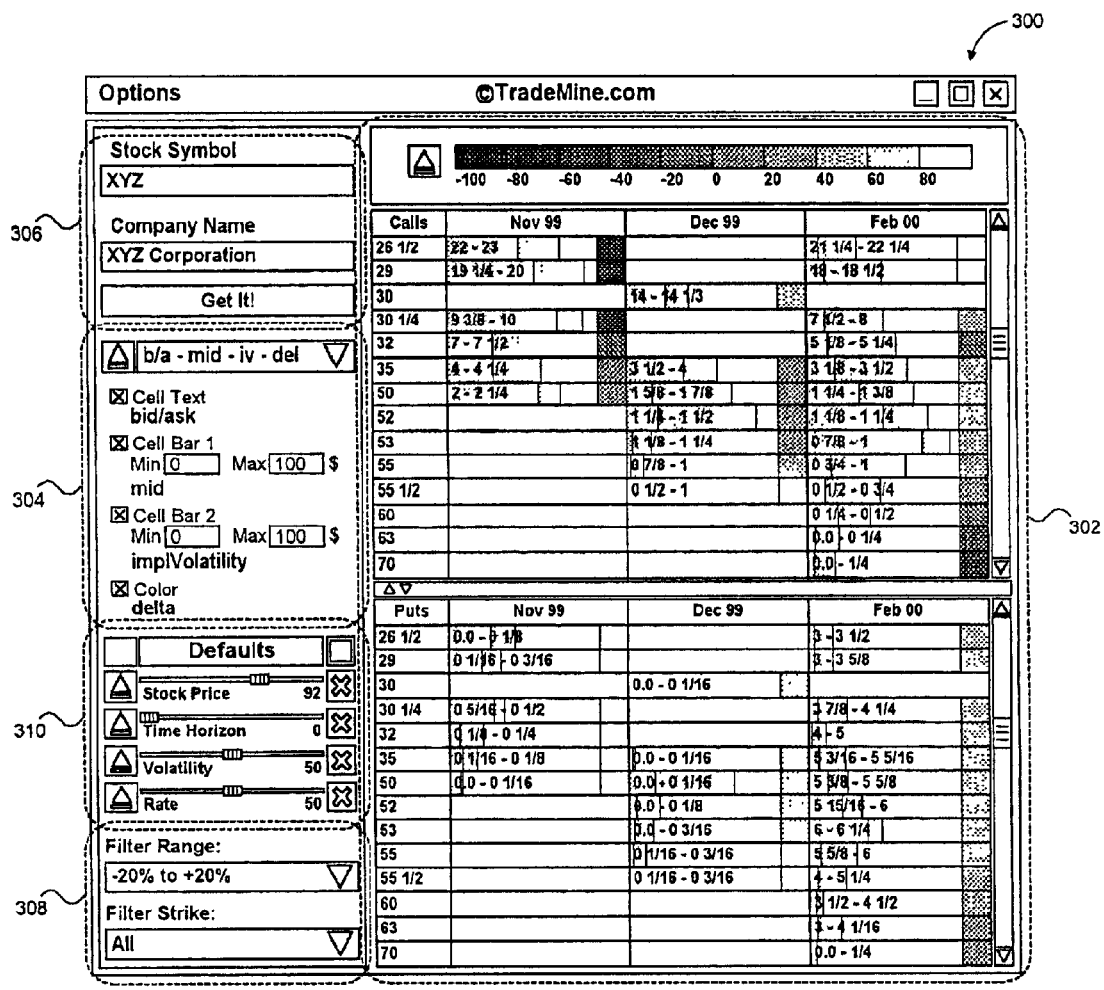
FIG. 3 shows a representation of an options screen as seen by a client using a graphical web browser.

In FIG. 3, a representation of an options screen 300 displayed at the client's computer terminal is shown. It should be noted that although FIG. 3 is shown containing options financial data, the present invention is not limited to such investments, and may be applied to other types of assets such as stocks, bonds, currencies, commodities, mutual funds, etc. As further described and shown, the options screen 300 presents a high level of investing data to the client, while allowing the client to quickly and easily analyze and compare investment choices. The information displayed at the options screen 300 is considered real-time, meaning the data displayed is typically only minimally delayed as it passes from the financial exchanges 100 to the client 112 (see FIG. 1).

The options screen 300 includes five major sections: an investment display section 302, a display control section 304, an asset selection section 306, a filter control section 308, and a simulation control section 310. Each screen section is preferably executed in a separate program module running on the client's computer 112. The program modules are preferably written as Java applets transferred to the client 112 by the computing center 108. The program modules are then executed by the client's graphical browser. This configuration, however, is just one possible environment of the present invention and is not intended to limit the present invention. For example, the program modules may alternatively be written in other programming languages, such as C, Perl, and Visual Basic. In addition, the program modules may be executed in part or entirely at the computing center 108 by means of known server side solutions, such as a Common Gateway Interface (CGI).

Figure 4:
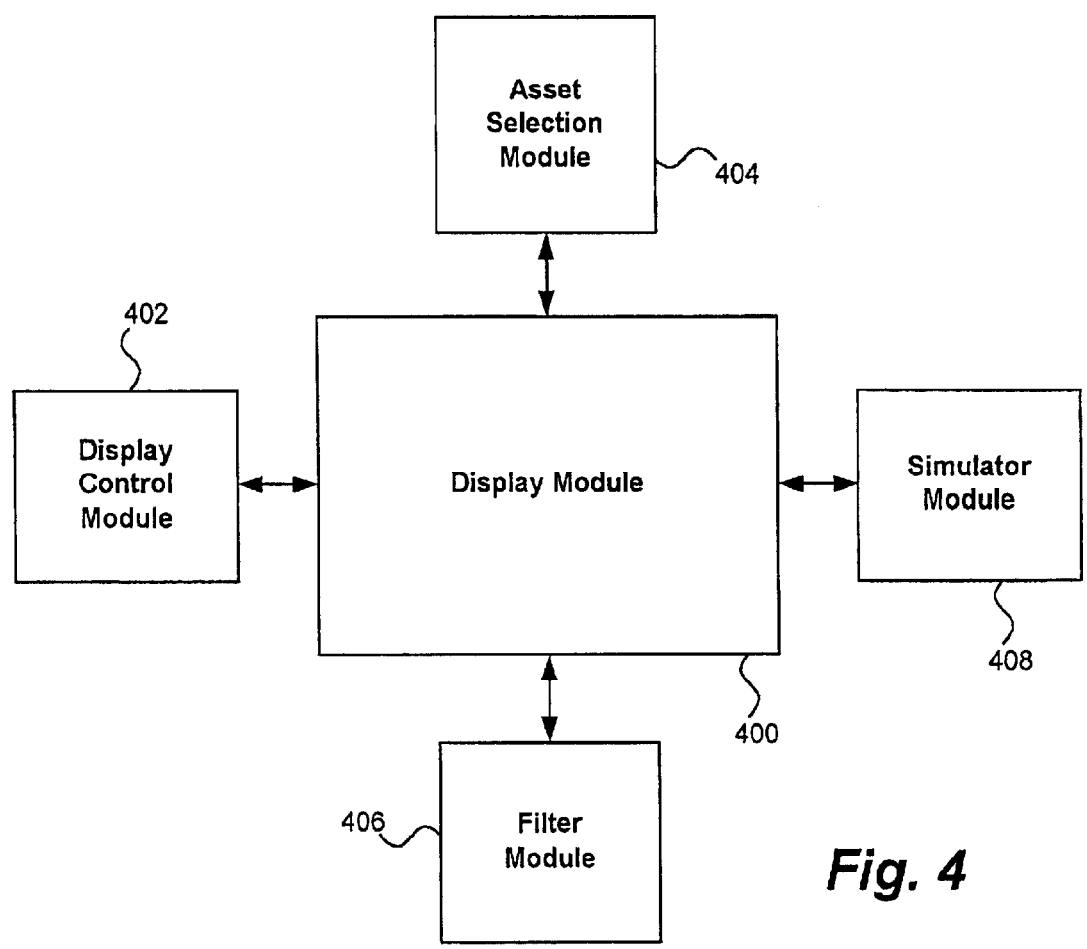
FIG. 4 shows the various program modules of the present invention and their relationships to each other.

In FIG. 4, the various program modules and their relationships to each other are shown. Central to the present invention is the display module 400, which provides investment data to the user. The display control module 402 controls how the investment data is shown by the display module 400. The asset selection module 404 communicates with the display module 400, and determines the current investment asset to be examined by the user. The filter module 406 allows the user to selectively focus attention on only particular investments shown in the display module 400. The simulator module 408 allows the user to modify investment data and analyze investments according to hypothetical market conditions. Each program module and screen section is described below in more detail.

Figure 5A:
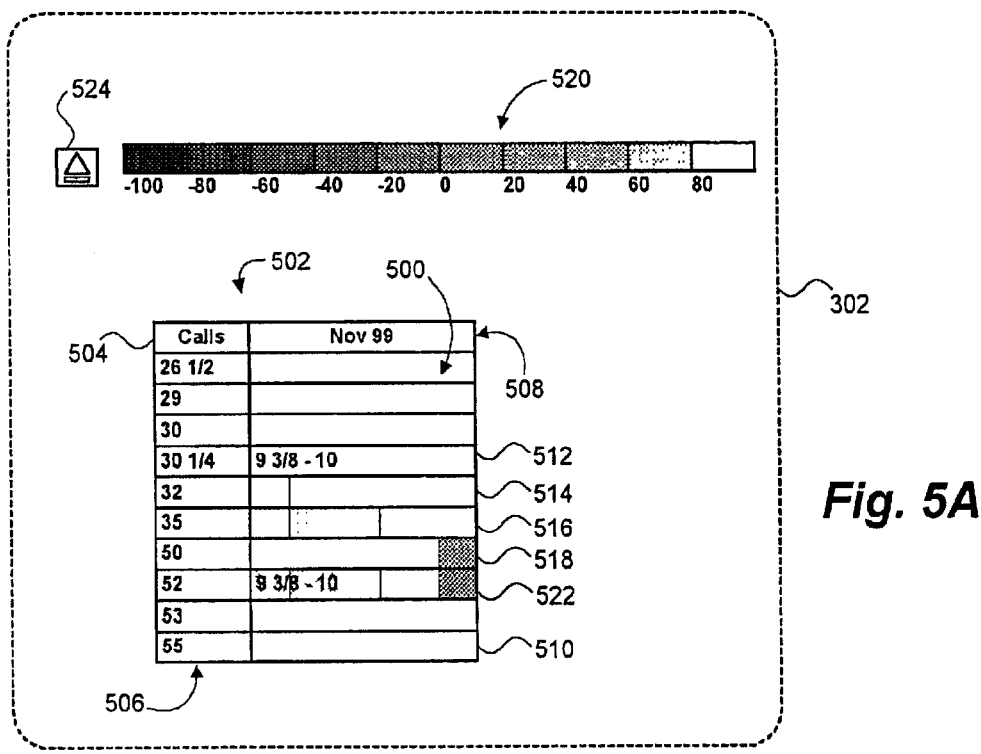
FIG. 5A shows a closer view of a an investment display section.

Referring now to FIG. 3 and FIG. 5A, the investment display section 302 is shown containing a plurality of investment cells 500 arranged as members of an investment table 502. A top left title cell 504 identifies whether the table contains call options data or put options data. Preferably, the investment display section 302 is user configurable to display only put options, only call options, or both. Below the title cell 504, a column of strike price cells 506 lists option strike prices for the stock named in the asset selection section 306. To the right of the title cell 504, a row of expiration date cells 508 lists option expiration dates for the underlying stock. Thus, an investment cell 500 within the option table 502 identifies a specific stock option investment having a strike price found horizontally at the strike price column 506 and an expiration date found vertically at the expiration date row 508. For example, cell 518 represents an option having a strike price of 50 and an expiration date of November 1999.

The present invention utilizes multidimensional display modes to convey investment data to the user. Human perception is such that voluminous information displayed textually can be easily confused or misinterpreted when quickly glanced. By representing financial data as colors and bar graphs, in combination with text, the user can more easily and quickly perceive and process the variety of information displayed. Moreover, each user may be more or less affected by a particular display mode. For example, one user may find color to be a predominant visual trigger over text, and the relative size of objects may effect another user more predominately. In each case, the display mode is highly configurable according to the user's personal preferences. Thus, a user more perceptive of color variations may represent important financial data using a color index, and less significant data as text.

Information regarding a particular stock option is displayed inside each investment cell 500. Each cell 500 may contain cell attributes such as cell text, a first and second bar, and an indicator color. As discussed in detail below, each cell attribute is associated to an investment parameter set in the display control section 304. For example, the investment display section 302 may be configured to show an option's bid/ask price as cell text, the option's mid price in the first cell bar, the underlying stock's implied volatility in the second cell bar, and the option's delta value in the cell indicator color, as shown in FIG. 3. Thus, the user is able to visualize and process large amounts of information about an investment at once. An empty cell 510 indicates that an option having the cell's corresponding strike price and expiration date is not offered by the subscribed financial exchanges. Investment parameters represented as text, bars, and colors, allows the user to quickly visualize and interpret changes in the market. Since multiple investments are displayed within the investment table 502, the user can also compare investments to each other and make better investing decisions.

Referring again to FIG. 5A, several cell configurations are shown with differing cell attributes for demonstration purposes. Preferably, however, all cells within the investment table 502 contain the same attribute configurations. At cell 512, only cell text is displayed, with the value of the represented parameter printed inside the cell. At cell 514, only the first bar is shown, and at cell 516, both the first and the second bars are displayed. The first bar is displayed to the right of the second bar, and it is contemplated that first and second bars may be differentiated from each other in several ways. For example, the two bars may be different colors, or a dividing stripe may be used, as shown, to separate both bars. Each bar's length independently varies according to the value of its represented parameter, with a longer bar indicating a higher parameter value. At cell 518, only the cell indicator color is displayed. In the embodiment shown, the indicator color is placed in the rightmost quadrant of the cell. Other embodiments of the present invention may position the indicator color at other locations within the cell, or use the indicator color as a background color filling up the entire cell. Each indicator color represents a value range, which is shown in a color index 520 located above the investment table 502. It is contemplated that the value ranges and the indicator colors are customizable by the user by means of a color selection button 524. At cell 522, all the cell attributes are displayed.

Figure 5B:
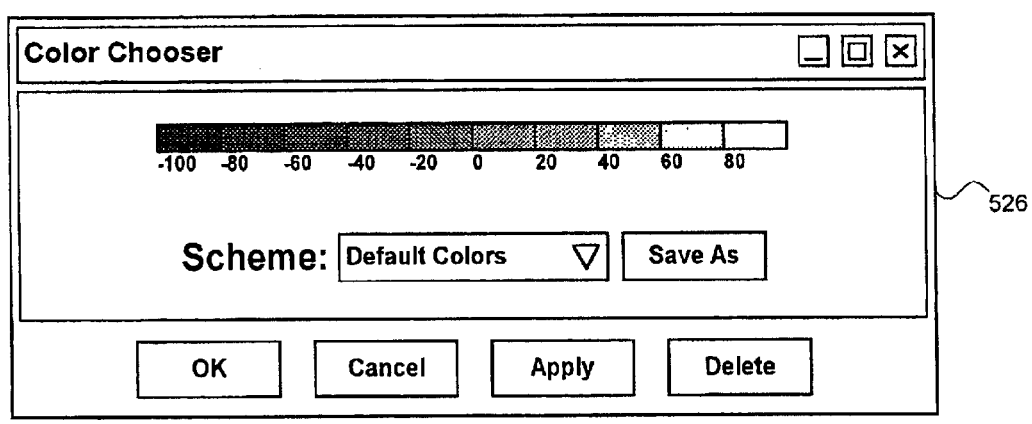
FIG. 5B shows a color selection dialog box.

In FIG. 5B, a color selection dialog box 526 is shown. The color selection dialog box 526 is normally invoked using the color selection button 524 shown in FIG. 5A. The color selection dialog box 526 allows the user to customize the value range of each indicator color, as well as the indicator color used to represent each value range. Color and value range schemes can be named and stored, thereby allowing the user to quickly recall a previously defined scheme.

Figure 6A:
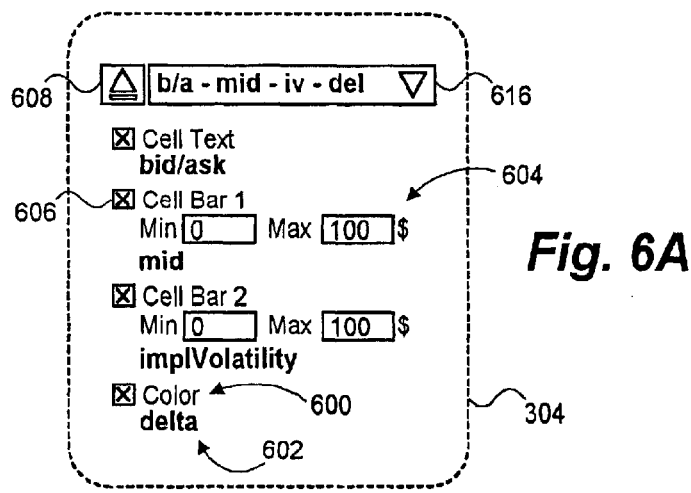
FIG. 6A shows a closer view of a display control section.

The display control section 304 controls how the cell attributes are displayed within the investment display section 302. As shown in FIG. 6A, the display control section 304 lists each cell attribute 600 (i.e., the cell text, cell bar 1, cell bar 2, and cell indicator color), along with its associated financial parameter 602. Cell bars have a min/max value fields 604 which determine the relative bar lengths of their associated parameters 602. Check boxes 606 next to each cell attribute 600 allow the client to select whether the attribute is displayed in the investment display section 302.

Figure 6B:
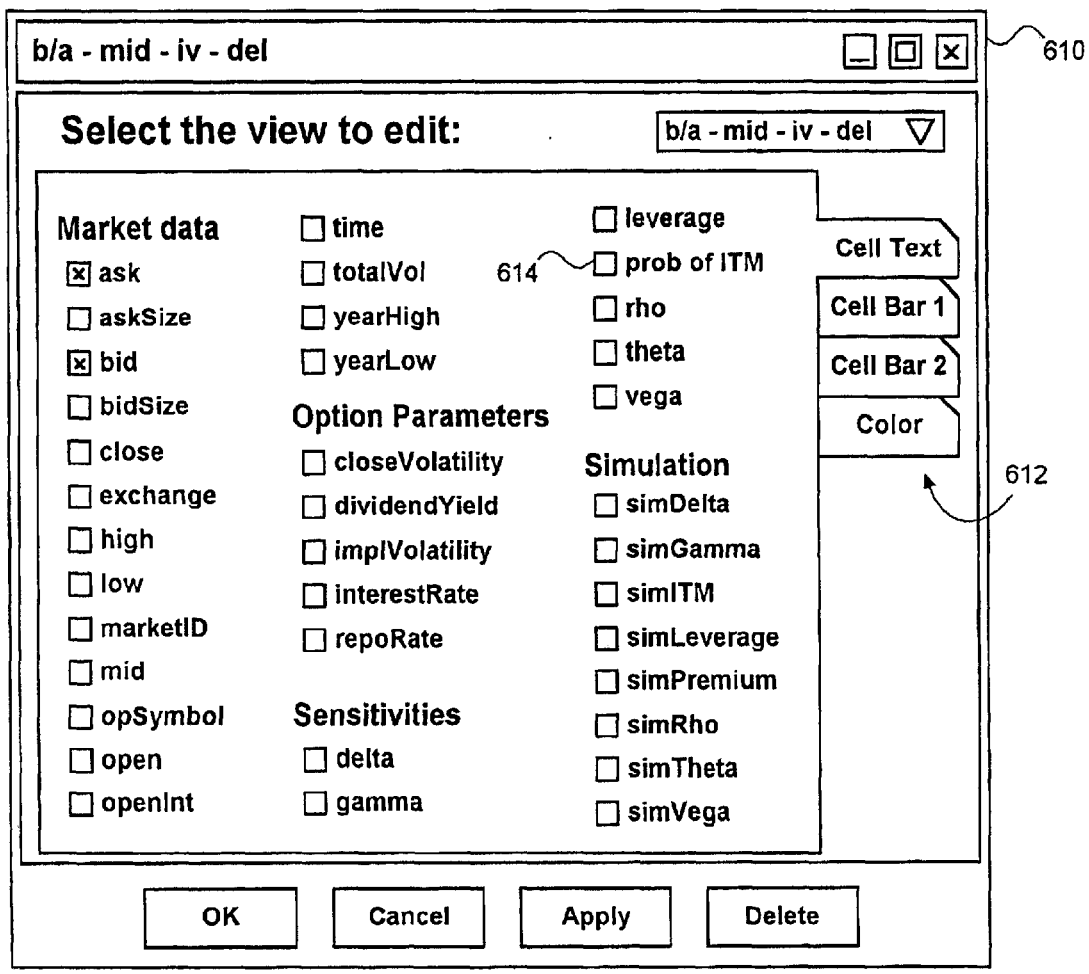
FIG. 6B shows a cell attribute dialog box.

To associate a cell attribute 600 with a financial parameter 602, a select button 608 is used to bring up a cell attribute dialog box 610, as shown in FIG. 6B. The dialog box 610 allows the user to assign or link investment parameters to the cell attributes. A user first selects which cell attribute to configure using the attribute selection tabs 612. Once the attribute is selected, a parameter is associated with the attribute by means of check boxes 614 next to each investment parameter. For example, in FIG. 6B, both ask price and bid price parameters are associated with the cell text attribute. The investment parameters listed in the attribute dialog box 610 are standard investing parameters well known in the industry, and are useful in analyzing, comparing, and forecasting options and other investments. These parameters are repeated in Table 1 for clarity. Furthermore, it is contemplated that some parameters may be deleted and other parameters may be added to the parameter list without departing from the scope and spirit of the present invention. Cell attribute configurations may be saved and later quickly retrieved using an attribute pull-down menu 616 in the investment display section 302.

TABLE 1

| Parameter listing | | |
|---|---|---|
| ask price | opening interest rate | leverage |
| ask volume | last trade update time | probability of in-the-money |
| bid price | total volume | rho |
| bid volume | year high price | theta |
| close price | year low price | vega |
| exchange location | closing volatility | simulated delta |
| day high price | dividend yield | simulated gamma |
| day low price | implied volatility | simulated in-the-money |
| market identification | interest rate | simulated leverage |
| middle trade | repo rate | simulated |

TABLE 1-continued

| Parameter listing | | |
|---|---|---|
| price | | premium |
| option symbol | delta | simulated rho |
| opening price | gamma | simulated vega |

Figure 7:
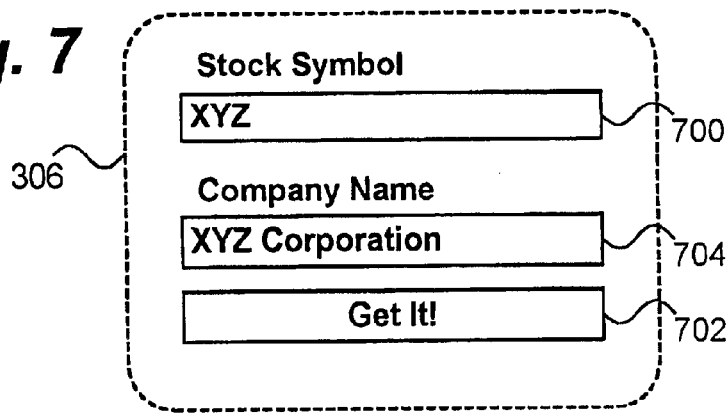
FIG. 7 shows a closer view of an asset selection section.

As mentioned earlier, the asset selection section 306 determines which asset's options are presented in the investment display section 302. Referring to FIG. 7, available stock options are retrieved from the investment server 210 (see FIG. 2) by entering a stock symbol(s) in the stock symbol input field 700. Pressing the options retrieve button 702 sends the stock symbol to the investment server 210, which searches for the stock's available options. If the stock options are found, they are transmitted to the client, along with option parameters specified in the display control section 304, and displayed in the options display screen 302. In addition, the investment server 210 logs the client's request and sends the client any data changes affecting the selected stock. If the user does not know the stock symbol for a particular company, he or she may enter the company name in the company name input field 704 instead. After pressing the options retrieve button 702, a search is executed in the investment server 210 for the stock symbol with the a company matching the entered name. If such a stock symbol is found, its available options are listed in the investment display section 302.

Figure 8:
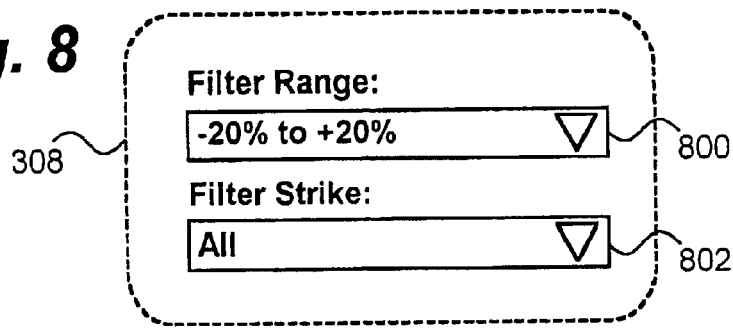
FIG. 8 shows a closer view of a filter control section.

FIG. 8 shows a closer view of the filter control section 308. The filter control section 308 allows the user to remove doubtful and/or superfluous investments from the investment display section 302. This can help simplify investment analysis by eliminating distracting information and help the user focus on important trading decisions.

A range field 800 is used to only list those options having a strike price within a user specified percentage of the underlying stock. Thus, the user can control how far "out-of-the-money" the listed options in the investment display section 302 can be. A filter strike field 802 allows the user to choose the difference in strike price between listed options. Thus, investment redundancy in the investment display section 302 can be lowered by increasing the required strike price difference between listed options.

Figure 9:
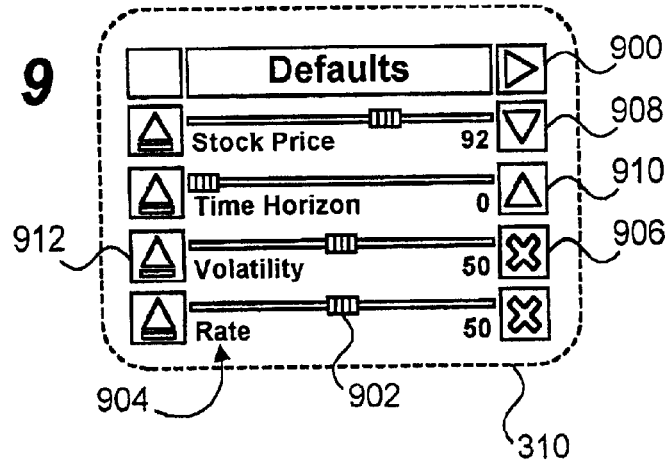
FIG. 9 shows a closer view of a simulation control section.

In FIG. 9, a closer view of the simulation control section 310 is shown. The simulation control section 310 allows a user to quickly determine if predicted market conditions will yield a favorable performance by the investment. In addition, the simulation control section 310 provides a means of comparing future performances of multiple investments, thus helping the investor choose the best investment.

Known investment algorithms, such as the Black-Scholes option pricing model, can predict the trading price of investments when a set of market parameters are provided. The present invention utilizes investment algorithms to determine the performance of investments for theoretical market conditions. Generally, the user selects one or more investment parameters to manipulate while all other parameters are held constant. Investment performance is then simulated by the modeling algorithms and displayed in the investment display section 302.

The enable simulation button 900 controls whether data displayed in the investment display section 302 is obtained from simulation calculations or the investment server 210. If the simulation mode is enabled, current market data is held constant, allowing the execution of investment modeling algorithms. During simulation mode, slide bars 902 allow the user to quickly change associated simulation parameters 904. As a slide bar is moved, the investment display section 302 is updated to reflect the simulated market conditions. In addition, jog buttons 906 may be used to automatically step through a range of parameter values. For example, button 908 is configured to decrement an underlying stock's price so that the effect of a stock's falling market price on investments can be viewed. Button 910 is configured to increment the time horizon, so that the option's time value may be visualized. The simulation parameters 904 may be selected through a simulation selection button 912. The simulation selection button evokes a simulation parameter selection box similar to the cell attribute dialog box 610, and selection of a parameter is accomplished in a similar manner.

Although the invention has been described and illustrated with a certain degree of particularity, it is understood that the present disclosure has been made only by way of example, and that numerous changes, combinations and arrangements of techniques can be resorted to by those skilled in the art without departing from the spirit and scope of the invention, as hereinafter claimed.

The invention claimed is:

1. A method for graphically representing investment information relating to a financial investment, the method comprising:

providing an investment cell in an investment table identified with the financial investment;

selectively linking a first cell bar with a first investment parameter, wherein the relative size of said first cell bar is proportional to said first investment parameter;

selectively linking a dynamic indicator color with a second investment parameter, wherein the color of said dynamic indicator color changes according to a value range of said second investment parameter;

displaying said first cell bar within said investment cell; and displaying said dynamic indicator color within said investment cell.

2. The method of claim 1 further comprising providing a minimum value field and a maximum value field to define the relative size of said first cell bar.

3. The method of claim 1 further comprising providing an indicator color index, said indicator color index includes an array of value ranges and a corresponding array of indicator colors, wherein said array of indicator colors contains said dynamic indicator color.

4. The method of claim 3 further comprising:

defining a user specified value range within said array of value ranges; and defining a user specified indicator color within said array of indicator colors.

5. The method of claim 1 further comprising displaying cell text within said investment cell, wherein said cell text is descriptive of a third investment parameter.

6. The method of claim 1 further comprising receiving at least one of said investment parameters from real-time financial data.

7. The method of claim 1 further comprising specifying the value of at least one of said investment parameters.

8. The method of claim 7 wherein the operation of specifying the value of at least one of said investment parameters further comprises automatically stepping through a range of values for said at least one of said investment parameters.

9. The method of claim 7 further comprising calculating at least another of said investment parameters.

10. The method of claim 7 further comprising calculating at least another of said investment parameters using a Black-Scholes option model.

11. The method of claim 1 further comprising receiving at least one of said investment parameters over the Internet.

12. A system for displaying investment parameter values of financial investments on a computer terminal, the system comprising:

an investment display section on the computer terminal;

an investment table within said investment display section, said investment table including a plurality of investment cells associated with the financial investments;

a first cell bar within at least one of said investment cells, said first cell bar configured to represent a first investment parameter, wherein the relative size of said first cell bar is proportional to said first investment parameter; and a dynamic indicator color within said at least one of said investment cells, said dynamic indicator color configured to represent a second investment parameter, wherein the color of said dynamic indicator color changes according to a value range of said second investment parameter.

13. The system of claim 12 further comprising cell text within said at least one of said investment cells, said cell text being descriptive of a third investment parameter.

14. A display structure for graphically representing a group of investment parameters of a financial investment on a computer monitor, the display structure comprising:

an investment table including an investment cell associated with the financial investment;

a first cell bar positioned within said investment cell, said first cell bar having a size proportional to a first parameter from the group of investment parameters; and an indicator color positioned within said investment cell representing a range of values, wherein a second parameter from the group of investment parameters has a value contained within said range of values.

15. The data display structure of claim 14, further comprising cell text positioned within the investment cell, the cell text describing a third parameter from the group of investment parameters.

16. A computer program product embodied in a tangible media comprising:

computer readable program codes coupled to the tangible media for graphically representing investment information relating to a financial investment, the computer readable program codes comprising:

first computer readable program code configured to cause the data processor to provide an investment cell identified with the financial investment;

second computer readable program code configured to cause the data processor to display a first cell bar within said investment cell, said first cell bar having a size proportional to a first investment parameter of the financial investment; and third computer readable program code configured to cause the data processor to display an indicator color within said investment cell representing a range of values, wherein a second parameter of the financial investment has a value contained within said range of values.

17. The computer program product of claim 16, wherein the tangible media comprises a magnetic disk.

18. The computer program product of claim 16, wherein the tangible media comprises an optical disk.

19. The computer program product of claim 16, wherein the tangible media comprises a propagating signal.

20. The computer program product of claim 16, wherein the tangible media comprises a random access memory device.

21. The method of claim 1 further comprising:
selectively linking a second cell bar with a third investment parameter, wherein the relative size of said second cell bar is proportional to said third investment parameter; and
displaying said second cell bar within said investment cell.

22. The system of claim 12 further comprising a second cell bar within said at least one of said investment cells, said second cell bar configured to represent a third investment parameter, wherein the relative size of said second cell bar is proportional to said third investment parameter.

23. The data display structure of claim 14, further comprising a second cell bar positioned within said investment cell, said second cell bar having a size proportional to a third parameter from the group of investment parameters.

24. The computer program product of claim 16, further comprising forth computer readable program code configured to cause the data processor to display second cell bar within said investment cell, said second cell bar having a size proportional to a third investment parameter of the financial investment.

25. The computer program product of claim 16, further comprising forth computer readable program code configured to cause the data processor to display cell text within said investment cell, said cell text being descriptive of a third investment parameter of the financial investment.

* * * * *